United States Patent
Davis et al.

(10) Patent No.: US 7,320,439 B2
(45) Date of Patent: Jan. 22, 2008

(54) SELF-CONTAINED INSECT REPELLING AND KILLING APPARATUS

(75) Inventors: Michael Davis, Santa Monica, CA (US); Charles Dykes, Houston, TX (US)

(73) Assignee: Mosquito Coast Holdings, LLC, Simi Valley, CA (US)

( * ) Notice: Subject to any disclaimer, the term of this patent is extended or adjusted under 35 U.S.C. 154(b) by 439 days.

(21) Appl. No.: 10/904,335

(22) Filed: Nov. 4, 2004

(65) Prior Publication Data
US 2006/0006197 A1    Jan. 12, 2006

Related U.S. Application Data

(60) Provisional application No. 60/521,300, filed on Jul. 12, 2004.

(51) Int. Cl.
B05B 9/04 (2006.01)
B05B 7/30 (2006.01)
B05B 7/12 (2006.01)
A01M 7/00 (2006.01)
A01M 1/20 (2006.01)

(52) U.S. Cl. ............... 239/329; 239/332; 239/340; 239/407; 43/132.1; 43/900

(58) Field of Classification Search ............... 239/329, 239/332, 340, 407, 67, 302, 310, 333, 350, 239/352, 398, 413, 417.5, 427, 427.3; 43/132.1, 43/900, 124; 222/333, 526, 145.1; 137/888
See application file for complete search history.

(56) References Cited

U.S. PATENT DOCUMENTS

| 4,355,763 | A | * | 10/1982 | Brandt | 239/302 |
|---|---|---|---|---|---|
| 4,638,924 | A | * | 1/1987 | Newsom | 222/1 |
| 4,721,727 | A | | 1/1988 | Mikolajczak et al. | 514/473 |
| 5,004,158 | A | * | 4/1991 | Halem et al. | 239/310 |
| 5,303,866 | A | * | 4/1994 | Hawks, Jr. | 239/142 |
| 5,533,298 | A | | 7/1996 | Teng | 43/112 |
| 5,813,166 | A | | 9/1998 | Wigton et al. | 43/107 |
| 6,032,407 | A | | 3/2000 | Conner | 43/129 |
| 6,050,025 | A | | 4/2000 | Wilbanks | 43/112 |
| 6,199,316 | B1 | | 3/2001 | Coventry | 43/132.1 |
| 6,272,790 | B1 | | 8/2001 | Paganessi et al. | 43/107 |
| 6,305,122 | B1 | | 10/2001 | Iwao et al. | 43/112 |
| 6,464,063 | B2 | * | 10/2002 | Colicchio | 194/242 |
| 6,467,215 | B1 | | 10/2002 | Nelson et al. | 43/107 |
| 6,591,545 | B2 | | 7/2003 | Brunet | 43/112 |

(Continued)

Primary Examiner—Darren Gorman
(74) Attorney, Agent, or Firm—Law Offices of Ken Dallara; Ken Dallara (57) ABSTRACT

An apparatus for the purpose of dispensing a chemical agent whose function is to detract or alternatively attract and destroy, insects, in particular, flying insects. The apparatus consists of a chemical source, a connection to a fluid source, usually water, a reservoir for chemical mixing and a pump for mixing and creating pressure. Mixing reservoir is of such size to eliminate any chance of chemical mixture separation and where the chemical mixture is agitated prior to each dispensing cycle. Fluid is disbursed under pressure through a series of atomizing devices, interconnected to the apparatus through a flexible plastic delivery conduit. The Apparatus functions are controlled through the use of an electronic interface. Preferred agent used is pyrethrum based, naturally occurring or synthesized, which possesses an antagonistic effect toward targeted pests but apparatus is designed to be adaptable to a wide range chemicals.

20 Claims, 7 Drawing Sheets

U.S. PATENT DOCUMENTS

| | | | |
|---|---|---|---|
| 6,594,946 B2 | 7/2003 | Nolen et al. | 43/114 |
| 6,618,984 B1 | 9/2003 | Li | 43/112 |
| 6,899,282 B1 * | 5/2005 | Hill | 239/61 |
| 2005/0211796 A1 * | 9/2005 | Lovett | 239/332 |

* cited by examiner

Exploded Tank and Bottle Unit

SELF-CONTAINED INSECT REPELLING AND KILLING APPARATUS

CROSS REFERENCE TO RELATED APPLICATIONS

This application claims the benefit of U.S. Provisional Application No. 60/521,300 filed Jul. 12, 2004, which application is incorporated herein by reference.

BACKGROUND OF INVENTION

Biting flying insects and arthropods have been troubling humans and their pets for as long as history is written. Flying insects such as Mosquitoes, wasps and even the common house fly detract from the enjoyment of outside activities. Mosquitoes in particular are the kind of flying insects that can not only cause annoyance but serious health problems. Diseases such as malaria, West Nile Virus and encephalitis are believed carried by mosquitoes and such diseases are transferred when a mosquito breaks the barrier that protects humans and animals from outside influences, the skin. Studies have shown that mosquitoes prefer small mammals to humans as the mosquitoes are more naturally attracted to mammalian scents than human scents. Animals are also affected, in some cases worse than humans are, as animals are not able to assimilate modern medications as well as humans to counteract the poisons in their systems introduced by disease carrying biting insects. Arthropods such as ticks, which can spread Lyme disease, fleas and common garden pests such as aphids and mites, are the targets of many eradication efforts of the homeowner. Animals are also more susceptible to arthropods than humans as animals are in locales which are native to the arthropods, such as grassy fields, which tend to be in the places animals live and play.

The benefit of the seed of the Pyrethrum Daisy, *Tanacetum cinerariarfolium*, a member of the Chrysanthemum family, has been found in early Chinese writing. The tiny oil glands surrounding the seed case contain the naturally occurring substance Pyrethrum, which is made up of six complex chemical esters known as Pyrethrins which work in combination to repel and in sufficient concentrations, kill harmful insects. When Pyrethrum is mixed with synergists, which are compounds that multiply the effects of their host chemical, Pyrethrum is effective against large range of biting or harmful insects and arthropods. The synergist commonly used with Pyrethrum is Piperonyl Butoxide. At lowest concentrations (0.005-0.1%), Pyrethrum acts on harmful insects to affect abnormal behavior in the female of the species, causing them to either to flee the area or to not continue their normal behavior of finding warm blood in their hosts. At greater concentrations (0.1-0.5%), insects loose their normal behavioral pattern, acting erratically by coming out of hiding and into the open area where they are consumed by their natural enemies or they can come in contact with more Pyrethrum. At higher concentrations, Pyrethrum causes insect's central nervous to become greatly over-sensitive causing a rush of sensory messages throughout the body causing paralysis and death. The main benefits of this natural insecticide include it's non-toxicity to humans and animals, due to the fact that humans and animals can not metabolize the chemical in their bodies, there is a non-persistent buildup in the environment and it is fast acting. Non-persistent buildup in the environment, which is caused by the breakdown of this chemical quickly by sunlight called phytotoxicity, contributes to the extremely low incidence of insect resistance. Pyrethrum has a very fast paralyzing action which causes the insects to end up on the floor, or what is commonly referred to as knockdown. Modernly, naturally occurring Pyrethrum has been synthesized into a compound called Permethrin. This synthesized version is not intended to repel insects as it works as a contact insecticide, stunning or killing insects that come in contact with the synthesized compound.

There are two basic modes of dealing with flying insects; either attract and kill or detract and avoid. Repellants can be natural with a botanical origin, such as citronella, or synthetic chemicals or even sound waves as described in U.S. Pat. No. 6,467,215, issued Oct. 22, 2002 to Nelson. Repellants of a synthetic nature kill flying insects and arthropods usually on contact usually by altering the method signals are sent from the body to the brain via the neural network of nerves and sensors. Repellants that are not topically absorbed by the insects can linger in the surrounding area to serve as a deterrent from flying near the treated area. Unfortunately, those chemicals with persistent buildups will be counterproductive, as insects are able to develop immunities to chemicals if they are constantly introduced to a particular chemical. Repellants of a natural organic base, either are applied to surfaces which are known to attract insects or are carried through the air through means of air currents.

Attractants can include several different approaches in any one device. Common attractants include Carbon dioxide, aromatics, both natural and chemical, sunlight, as in U.S. Pat. No. 6,618,984 issued Sep. 16, 2003 to Li and devices that mimic the human or animal bodily functions of respiration as described in U.S. Pat. No. 6,050,025 issued on Apr. 18, 2000 to Wilbanks. It has long been known that the air that is exhaled by humans and pets contain warm Carbon Dioxide, which has been determined to be an attractant to flying insects. Studies have shown that mosquitoes can be attracted from a distance as far as 100 feet away by the presence of Carbon Dioxide expelled by living organisms. Light is also an attractant, as one only has to turn on a light on a summer's night, to see the mosquitoes and moths gathering. Some devices use heat combined with pheromones or natural attractants to act as a lure to draw insects into chambers where they are unable to escape or are electrocuted. Some devices use a combination of heat, Carbon Dioxide and chemical attractants such as octenol. U.S. Pat. No. 6,594,946, issued Jul. 22, 2003 to Nolen. Once the insect is attracted then the device is hopefully sufficient in design to dispatch with the insect, usually through means of electrocution, death by drowning or starvation as they trapped and too confused to find their way out of their trap. Arthropods are generally dealt with where they nest and breed through chemical means. They generally respond to biological based attractants placed in such locations, as their natural surroundings in which they live and breed.

Presently available prior art can be broken down into two categories, either fogging, exuding a chemical agent through the use of positive pressure or passive or stationary devices. Fogging units can expel toxic chemicals, combination of natural or synthetic compounds or gas. Passive units try to attract flying insects toward the device whereby the insect is either trapped or killed on contact with the surface of the device.

Passive units provide an array of options. Units mounted on houses as described in U.S. Pat. No. 6,591,545 issued Jul. 15, 2003 to Bruent is a classic model where an electric grid is used to kill the insects attracting them with Carbon Dioxide. Passive units unfortunately fill with killed insects causing health problems and unfortunately attract flying insects to where the humans exist, rather than keeping the flying insects away from the human and pets in the first place. These devices also kill indiscriminately so beneficial insects will be killed along with the biting flying insects that one is trying to eradicate. This killing of beneficial insect is actually counterproductive as many insects actually deter the presence of the biting insects. Killing the beneficial insects only allows more of the biting insects to more easily survive their natural predators. These devices are also limited in location by their source of power limiting their distance from locations where humans and their pets use for their enjoyment. The increased emission of Carbon Dioxide by these devices also aids to the deterioration of the earth's atmosphere. These greenhouse gases can be detrimental to the ozone layer that protects our planet from the harmful infrared rays of the sun.

Fogging systems can be as simple as a can of bug spray to vehicle mounted systems powered by gas turbines. U.S. Pat. No. 6,032,407 issued Mar. 7, 2000 to Conner. These devices use mechanical means to distribute either repellant or attractant type of natural or systematic chemicals via a pressured means. One advantage of this kind of system is that it can be used at a greater distance from people and their pets. It is critical to the successful device that the chemical is dispersed in a very fine droplet form for the maximum coverage and so that natural air currents can be used to further spread the application of the chemical. It is also critical that care is used in the storage, concentrating, dilution, and delivery of the chemical agent. Since fogging system are mechanical devices, it is also critical that safety of the operator and those whose activities bring them near to the fogging device, are protected and guarded against accidental contact with the harmful chemicals and mechanical devices.

The present invention is in the fogging class of devices, and is used by residential or commercial users. Currently this size of fogging device is usually mounted on a 55 gallon drum which is filled with chemicals and water, whereupon a pump is placed on top of the drum and a supply line is run from the unit to atomizing misting devices. Companies such as Bug Defense, Mosquito Mister and Ritterhouse make such units and are generally sold through-out markets in the Southeast.

SUMMARY OF INVENTION

The object of the present invention is to provide a superior, novel product that uses Pyrethrum, either in it's natural or synthetic state, as a means to either attract or repel flying insects which is devoid of the problems associated with the prior art.

The foregoing objects are accomplished according to this invention by the novel application of combining 18th century knowledge with 21st century technology. A primary purpose of the invention is to provide a closed system whereby chemical insecticides that are used can not evaporate, be subject to contamination or experience a decrease from chemical potency due to demulsification or environmental influences. Another purpose of this invention is to create an apparatus that is safe, both in the manner of use and in the storage of chemicals and chemical mixture. Currently available systems of this size simply consist of a 55 gallon drum with a pump unit located on top of or immediately appurtenant to, the drum. The drum contents are not sealed hermetically from the outside. Chemicals are poured into the drum without regard for the safety of the user from contact with the chemical. The drum is then filled with water usually from a garden hose attached to the exterior faucet. The drum now contains chemical insecticides that have been mixed into a water base The drum serves as the fluid container as well as the mixing vessel. Once mixed, the drum stands in a vertical position. A lid is attached, but it is not completely sealed from the outside influences. Due to the need for pump interface and air relief vents, relief holes are cut in the lid, and the drum's contents with the presence of heat will evaporate. Also due to outside air influences, contamination can be introduced into the chemical mixture. Contamination can be introduced from the outside air that surrounds the drum as well as from the water that is used as the mixing agent with the chemical. The present invention utilizes separate tanks for chemical storage and mixing, which are part of a closed system, whereby airborne contamination is not possible nor is evaporation possible. This closed system also eliminates contact the user could have with the chemical as the chemical is never released by the user into the unit. Contamination can also be introduced by the water source used to dilute the chemical. Water borne contamination can include such chemicals as chlorine, can cause adverse chemical reactions with the chemicals used, effecting their performance. Dissolved minerals such as calcium and magnesium can also affect chemical efficacy as well as affect the misting nozzles that disperse the chemical. The preferred embodiment of the present invention uses chemical filtration or resin based filters that chemically alter those chemicals or minerals which are harmful to the efficiency of such repelling or killing systems. These filters provide a cleaner fluid that is mixed with the natural chemicals that are used. This filtration removes most chemicals from the fluid that would have adverse reactions with the insect repelling or killing chemicals as well as removes the mineral composites that will effect the function of the atomizing devices. The most inherent problem with the prior art mixture of chemical and water in the drum, is that over time, the chemical in solution will tend to separate or demulsify, causing the mixture not to be in perfect solution. And as such, as the pump draws the mixture from the 55 gallon drum, the chemical concentrations are not consistent causing uneven application of chemical. This lack of proper dilution can enable the user to place a much higher concentration of chemical into an area where humans and animals can be affected by this higher concentration of chemical. The inverse is also true, as higher concentrations of the water base and lower chemical concentration will not perform the task of repelling or killing the harmful insects. The current invention prevents demulsification by only mixing small batches of chemical with a fluid at the time of needed application and using the mixture prior to the time that the chemical fluid mixture can demulsify.

The prior art does not present a system that is weather-resistant, and must be sheltered from the elements and weather. The present invention uses a superior closure, which is weather and leak resistant, eliminating evaporation and contamination. Another problem associated with the prior art, is that children or others have direct access to the chemical mixture without any device preventing accidental contact with the chemical mixture. The current invention has a locking enclosure that prevents accidental contact with any of the chemicals by children or others. Another problem associated the prior art is the chance of injury and accidental discharge of the chemical mixture when the large top heavy drum containing the chemical mixture topples over or is punctured by a sharp object. These drums are constructed of a plastic compound, usually polyethylene, which can be penetrated with a simple pen knife or similar object. Since these drums must be placed in a covered location due to the lack of protection of the components from weather related harm, such as a garage, the chance of accidental contact with automobile or similar heavy object can cause the unit to tip over or be crushed, causing failure or rupture of the system. This tipping over can cause damage to the mechanical operating unit, and the discharge harmful chemicals at possibly higher than acceptable concentrations, into areas where these chemicals can cause harm to those who come in contact with these discharged chemical or the chemical is allowed to enter into the sewer or storm drain system. Since the present invention is weather resistant it does not have to be placed in such an area where humans or animal are effected by it's presence, and due to it's small size, it is not subject to tipping and because of it's construction, it is not penetrable with normal household objects. Another safety concern with the prior art, is centered around the filling of the large drum with water to dilute the chemical. Users generally fill the drum with a garden hose that is placed into the drum and is often submerged below the surface as it fills. Shutting off of the water supply creates a siphoning action whereby the chemical mixture enters into the garden hose due to the creation of higher pressure in the drum and lower pressure in the garden hose. This siphoning action can allow the chemical mixture to enter into the drinking water supply of the user. Current plumbing codes suggest the use of backflow prevention devices on all external hose faucets but few are actually used or are used properly. The current invention incorporates a built-in backflow prevention device which is installed as per the current Universal Plumbing Code, usually referred to in the industry as the UPC. This device prevents any of the chemical mixture from siphoning up from the mix tank through the suction and metering device and into the drinking water supply.

Currently there exists no devices which are able to counteract the problems associated with the prior art. There exists a need to counteract the problems associated with the prior art. The prior art presents many harmful and potentially deadly side effects due to their design and application. This current invention defeats the problems associated with the aforementioned prior art, by producing a modular unit, whereby a naturally occurring substance is used to repel the harmful flying insects and arthropods. This naturally occurring substance is contained in a specially designed container, designed to hold only approximately one gallon of the substance. A small mix tank is used, whereby a fluid, such as water is introduced into the mix tank, and the substance is metered into the mix tank by the flow of the fluid. This flow is of such a force that it creates an emulsified solution that will remain in solution for a longer period of time and also because of the force of the mixture through the metering device, it reagitiates the remaining mixture in the mix tank. This mix tank contains only a small amount of the mixed substance/fluid mixture, hereby eliminating the chance of separation and evaporation. A pressurizing pump which naturally agitates the chemical/fluid mixture in the process of drawing the mixture into the pressuring chambers of the pump, creates the pressure required to propel the mixture into the atomizing devices, sequentially spaced along the exit line attached to the pump.

BRIEF DESCRIPTION OF DRAWINGS

The present invention that will defeat the problems aforementioned with the prior art will now herein be described in detail with reference to the preferred embodiments of the apparatus herein noted, with reference to the drawings, which contain the reference numbers which are hereafter referred.

DETAILED DESCRIPTION

Referring to FIGS. 1 to 6, the apparatus according to the first embodiment of the invention is described in detail. The apparatus 1 is an apparatus for repelling, or in the alternative, killing harmful flying insects and arthropods that are disruptive of the aforementioned enjoyment and safety in the outdoor environment, apparatus 1 is shown with an electrical means. The Apparatus 1 shown in FIG. 1 includes an encasement 2 contained thereupon apparatus 1, which encasement 2 is constructed either of a metallic compound or plastic composite, sufficient to withstand weathering, ultraviolet rays and be resilient enough to maintain the strength necessary to hold the components of the apparatus 1 securely in place. The preferred material is a rectangular piece of stainless steel which has been shaped to create 4 sides of a rhombus shaped object. One open end of the rhombus shaped object, defined by the lower edge of said rhombus shaped object, is attached a single stainless steel sheet with folded edges which forms the bottom of encasement 2. Bottom, 30 is attached to the rhombus shaped encasement 2 with the use of mechanical or welded means. Other materials such as plastic composites use thermal or chemical bonding attachment means. This invention could also be made in a single injection or rotationally molded piece, encompassing both the encasement 2 and the bottom 30 in one integral piece. Bottom 30 is fitted with at least two elevating means 3, preferably 4 elevating means, elevating means 3 are attached to bottom 30 by either mechanical or welded means. Elevating means 3 are preferably rectangular or round in shape whose purpose is to provide a spatial gap whereby air is allowed to circulate around the encasement 2 and also to prevent bottom 30 of encasement 2 from being placed directly into a fluid, such as water, which might have corrosive effects upon the encasement 2. Elevating mean 3 and encasement 2 are encapsulated with a compounded that prohibits the creation of oxidation or pitting of the metal and said compound should contain an agent which produces a color which is applicable to the surrounding with which the apparatus will be associated. Encasement 2 will have a solid lid 4, attached to opposite open end of said rhombus shaped object of bottom 30, which will be attached to encasement 2, via a mechanical hinged means, such as piano style hinge 53, securely attached to both solid lid 4 and sides of encasement 2. Solid lid 4 will be constructed such that the solid lid 4 will overhang all vertical sides of the encasement 2 and solid lid 4 will prevent weather and moisture from gaining access to the interior of encasement 2. Solid lid 4 will provide the user with access to the interiorly contained mechanical mechanism of apparatus 1 herein encased by encasement 2. Solid lid 4 has locking means 32 attached thereto on the side opposite of the hinged means. A Shield 5 is constructed of a similar material to encasement 2 and is inserted into the interior of encasement 2. Shield 5 may be attached to the interior vertical walls of encasement 2 through the use of mechanical fastening means or through simple friction or force fit tolerances. Shield 5 has the purpose of providing additional protection from weathering and moisture, as well as provide a safety barrier from the accidental assertion of human or animal body parts into the internal mechanisms of the apparatus 1. Shield 5 also prevents any contamination of the interior of the encasement 2 from chemicals introduced from the chemical bottle 6. Chemical bottle 6 is a separable unit constructed of a material such that it will not degrade, deteriorate, or contaminate any chemical that would possibly come in contact with it. In this instance, polypropylene or low density polyethylene is used. Chemical bottle 6 is constructed into a container that holds at least 1 gallon of liquid chemical and is of single piece construction without welded section which could cause leakage or failure. It is preferred that the chemical used is Pyrethrum, but any derivative of Pyrethrum, synthetic or natural, or other preferably safe chemical compound can be used. All of the components can be altered to adapt to those chemicals that are not able to be contained in a form of plastic. Self-venting cap assembly 8 is a two piece device which is attached to chemical tank 6 through male and female threaded interlocking pieces, where the female piece has been forcibly inserted into the chemical bottle 6, and the male piece is threadably attached to the female piece, male piece of device contains the mating section which is received by the venting cap adaptor mount 7. An O-Ring groove in the male section of self-venting cap assembly 8 assures positive seal between the mating pieces should the thread themselves fail to seal against leakage of chemical outwardly from chemical holding tank 9. Self-venting cap assembly 8, which incorporates a built-in check valve allows the user to invert the filled chemical bottle 6 without possibility of leakage. User positions chemical bottle 6 into venting cap adaptor mount 7, positively so that it is securely received by self-venting cap assembly 8, creating a contaminate free breathable one-way seal between chemical bottle 6 and chemical holding tank 9. Self-Venting Cap Assembly 8 that is used in this embodiment is made by RP Industries, U.S. Pat. No. 5,988,456, but any self-venting cap assembly can be incorporated. Venting cap adaptor mount 7 which is spinwelded attached onto chemical holding tank apparatus 9. In this invention, a tank 9, is used to hold the chemical that is transferred from the chemical bottle, but this does not preclude the use of other devices that serve a similar purpose. Venting cap adaptor 7 is created for this particular self-venting cap assembly. The interface between the special venting cap adaptor mount 7 and self-venting cap assembly 8 creates an interface such that outside contamination is prevented from entering into the chemical tank 9 and also prevents evaporation of the chemical into the surrounding atmosphere. Due to the addition of a check valve system in the self-venting cap assembly 8, any dislodgement of the chemical bottle 6 from chemical tank 9 will not cause accidental spillage of chemical. Chemical existing in chemical bottle 6 will empty into chemical tank 9 naturally using gravity as the force. Once the contents of chemical bottle 6 are emptied into chemical holding tank 9, there is no need to keep the chemical bottle 6 in it's present location, and can be removed and re-filled for use at a later time. The female portion of self-venting cap assembly 8 will seal and prevent contamination from entering the chemical tank 9 while still allowing for a vacuum breaking effect when the unit is operating. Chemical holding tank 9 is can be shaped in such a manner as to hold chemical bottle 6 providing physical support for approximately ¼ of the height of the chemical bottle 6. This support virtually eliminates the possibility of the chemical bottle being dislodged from chemical holding tank 9 by any natural means. A further embodiment incorporates the use of a foam bottle support 35, which places positive pressure onto the chemical bottle in case of severe use when apparatus 1 is violently dislodged from its usual position. Foam bottle support 35, is constructed of simple foam material stiff enough to securely place positive pressure upon chemical bottle 6 and which allows solid lid 4, to maintain a closed position without placing undo strain on the locking means 32. Foam bottle support 35, is adhesively attached to solid lid 4, using an adhesive which will bond to solid lid 4 and not degrade foam bottle support 35. Chemical holding tank 9 is the vessel into which chemical is released from the chemical bottle 6 and upon which the self-venting cap assembly mount 7 is weldably attached. It is constructed of similar material to that of the chemical bottle 6 and contains a plurality of at least 1, preferably 5, sensor through holes, which are placed in strategic locations allowing for optimal sensor positioning, into which are placed a plurality of sensor mounts 10, which are hermetically sealed onto the chemical holding tank 9 using a spinwelding process. Another throughhole is located on the top of the chemical holding tank 9, into which flush fitting 11 is placed which is hermetically sealed onto chemical tank 9 using a spinwelding process. Suction Tube 12 is located through flush fitting 11 and is attached to flush fitting 11 using a compression style coupling 39 and can be used to create a water and atmospheric seal surrounding the interface between the suction tube 12 and threaded flush fitting 11. One end of suction tube 12 is submerged inside of the chemical holding tank 9, located within 0.5 inch of the interior bottom of the chemical tank 9, located immediately beneath the flush fitting 11. The submerged end has attached chemical strainer 38 thereonto which has the purpose of providing weight to hold suction tube 12 in place and to remove any sediment that could have entered into the chemical. The opposite end of suction tube 12 is securely positioned into suction metering device coupler 13 using a compression style of adaptor designed to accept suction tube 12 as constructed. Suction tube 12 is constructed of such a material that will withstand the pressure built up during the operation of the apparatus and will not be adversely affected by the chemical and conversely not affect the chemical by contamination. In this embodiment, a fluorinated polyethylene material is preferably used.

Fluid for mixing with chemical is introduced from an exterior source, and is filtered. Another embodiment of this invention is filtration through chemical means. This external filtration unit 14, filters chemically using a high capacity resin style filter to remove compounds of dissolved solids such as calcium, potassium and magnesium that can cause clogging of the atomizing devices when the solids are allowed to desorb from the chemical mixture. Diatomaceous earth or other similar naturally occurring filtration media can also be used. The external filtration unit 14, attaches to the external fluid delivery source using a female threaded inlet. The outlet of unit 14 also contains internal female threads. The fluid that is preferred is water for this application. The external filtration unit, 14 is connected in series to the particulate strainer, 16 using threaded coupler, 15. Particulate strainer 16 is designed to remove sentiment and other particulate in the water, and has a flushing exhaust should the particulate strainer 16 become clogged and not able to deliver sufficient flow to the rest of the apparatus. Particles greater than 0.005 should not be allowed to proceed further past the external filtration device 14 and particulate strainer 16. Attached sequentially to particulate strainer 16, is solenoid valve 17, coupling means 18, and suction and metering device 19. Solenoid Valve 17 is electronically connected to the controller unit 20. Electrical power output from controller unit 20 electronically charges the normally closed solenoid into a position that allows fluid passage through the orifice of the solenoid valve 17 into the coupling means 18. Coupling means 18 can be straight or in this embodiment, a ninety degree turn or elbow, which directs fluid flow into the backflow prevention device 31 which is then coupled to the suction metering device 19. Coupling means 18 threadably, or in the alternative, using barbed connection devices, engages solenoid valve 17 and backflow prevention device 31. Backflow prevention device 31 prevents any fluid or chemical/fluid mixture from escaping out of the chemical tanks into the fluid source, which prevents contamination of the fluid source. Suction metering device 19 is threadably coupled to backflow prevention device 31.

Suction metering device 19 directs the flow of fluid across a small internal opening, perpendicular to the flow path of the fluid, creating negative pressure inside of the suction metering device coupler 13 so that a precise amount of chemical is drawn up into the Suction metering device 19 due to the negative pressure. Suction metering device 19 is commonly called in the industry as a venturi valve. Such valves are marketed by Dema Engineering and many others. Suction Metering Device 19 can be adapted to provide a broad spectrum of chemical concentrations. In this invention, suction metering device 19 can be set for up to 5% chemical mixture, preferably between 1 to 2 percent mixture. Fluid is mixed with chemical at a metered rate and is deposited into the chemical mix tank 21 through mix tank entrance opening 22. Chemical mix tank 21 has a spin-welded mix tank adaptor, 47 thereupon attached that accepts the exit of the suction metering device 19, creating a coupling that is water-tight, reducing chance of contamination or leakage. Due to the force of fluid from suction metering device 19 into the chemical mix tank 21, previously deposited fluid/chemical mixture is agitated every time new deposits are made thus preventing separation of chemical in solution with the fluid. Size of chemical mix tank 21 is such to promote renewal of the chemical/fluid mixture after virtually every chemical application cycle. Chemical mix tank 21 contains only enough mixed chemical so as to be used prior to chemical demulsification, preferably less than a 2 day requirement of chemical mixture. Chemical mix tank 21 is constructed of material similar to that of the Chemical tank 9 and has a one piece design with a plurity of openings. Chemical mix tank 21 is located appurtenant to and is nested with chemical tank 9. Another embodiment of apparatus 1, is the inclusion of chemical shut-off valve 37, which is threadably attached to flush fitting 11. Chemical shut-off valve 37 is manually operated, using shut off valve actuator 46, and allows user to prevent flow of chemical from chemical tank 9 into suction metering device 19. This allows operation of the apparatus 1, without the chance of chemicals being exhausted by the apparatus 1, for purposes of testing, installation or flushing out of the system. User accesses shut off valve actuator 46 from the outside of encasement 2.

Figure 1:
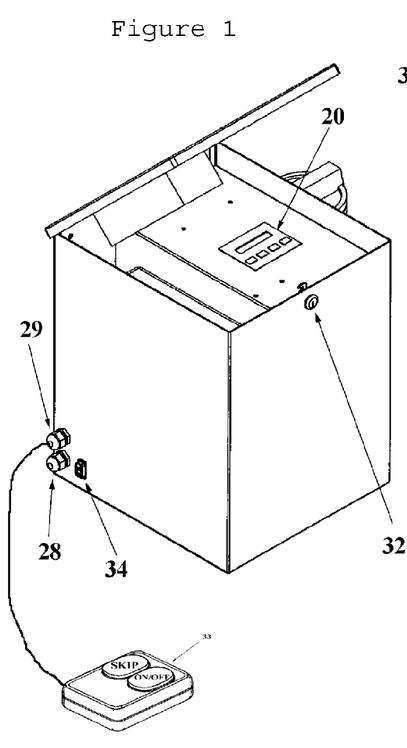
FIG. 1 shows assembled unit in a left side orthographic view with the top opened for ease of view. Remote Controller is shown attached to unit through the use of waterproof wire conduit.
Figure 1A:
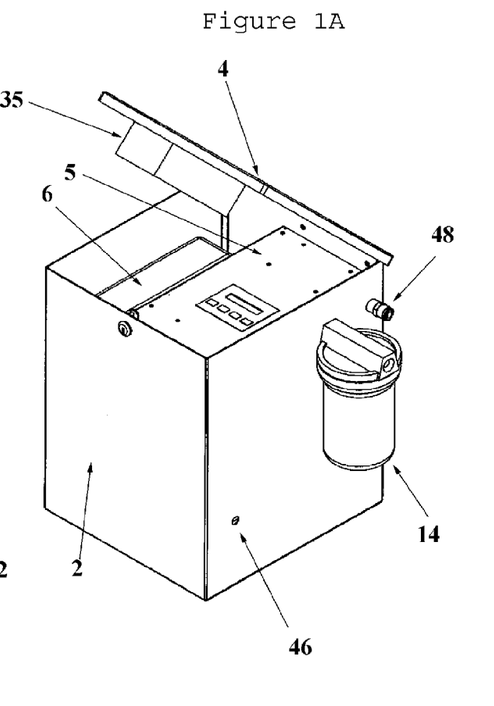
FIG. 1A shows the assembled unit in a right side orthographic view with the top opened for ease of view.
Figure 2:
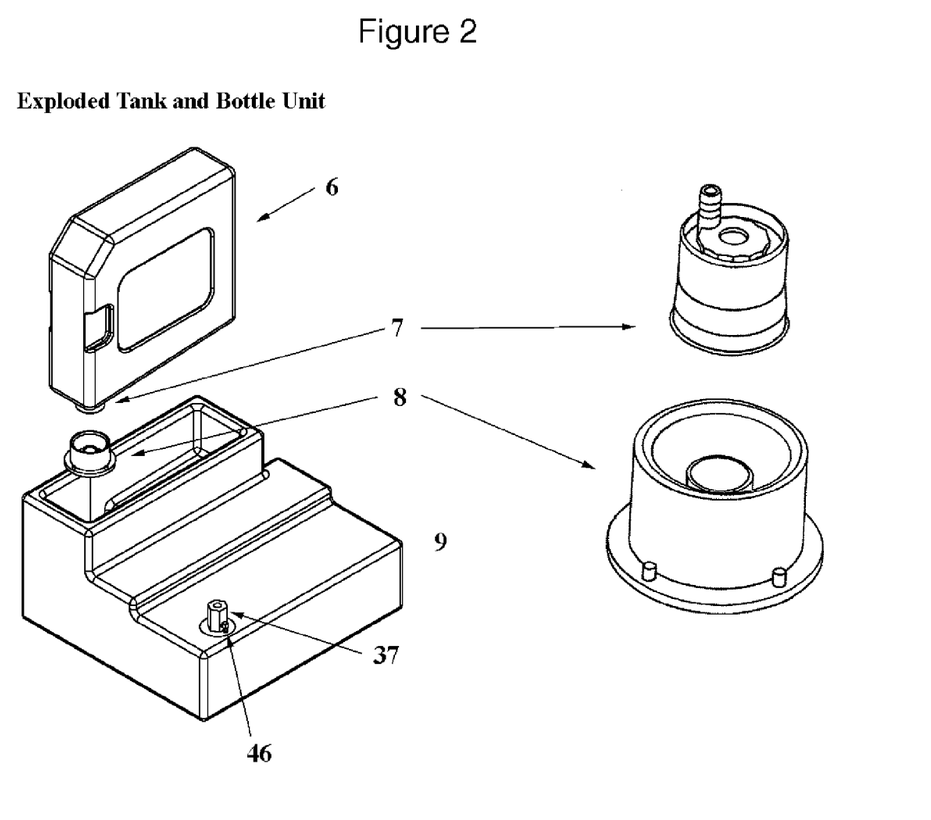
FIG. 2 shows the interface between the chemical bottle and the chemical tank with the venting cap breakout without the encasement.
Figure 3:
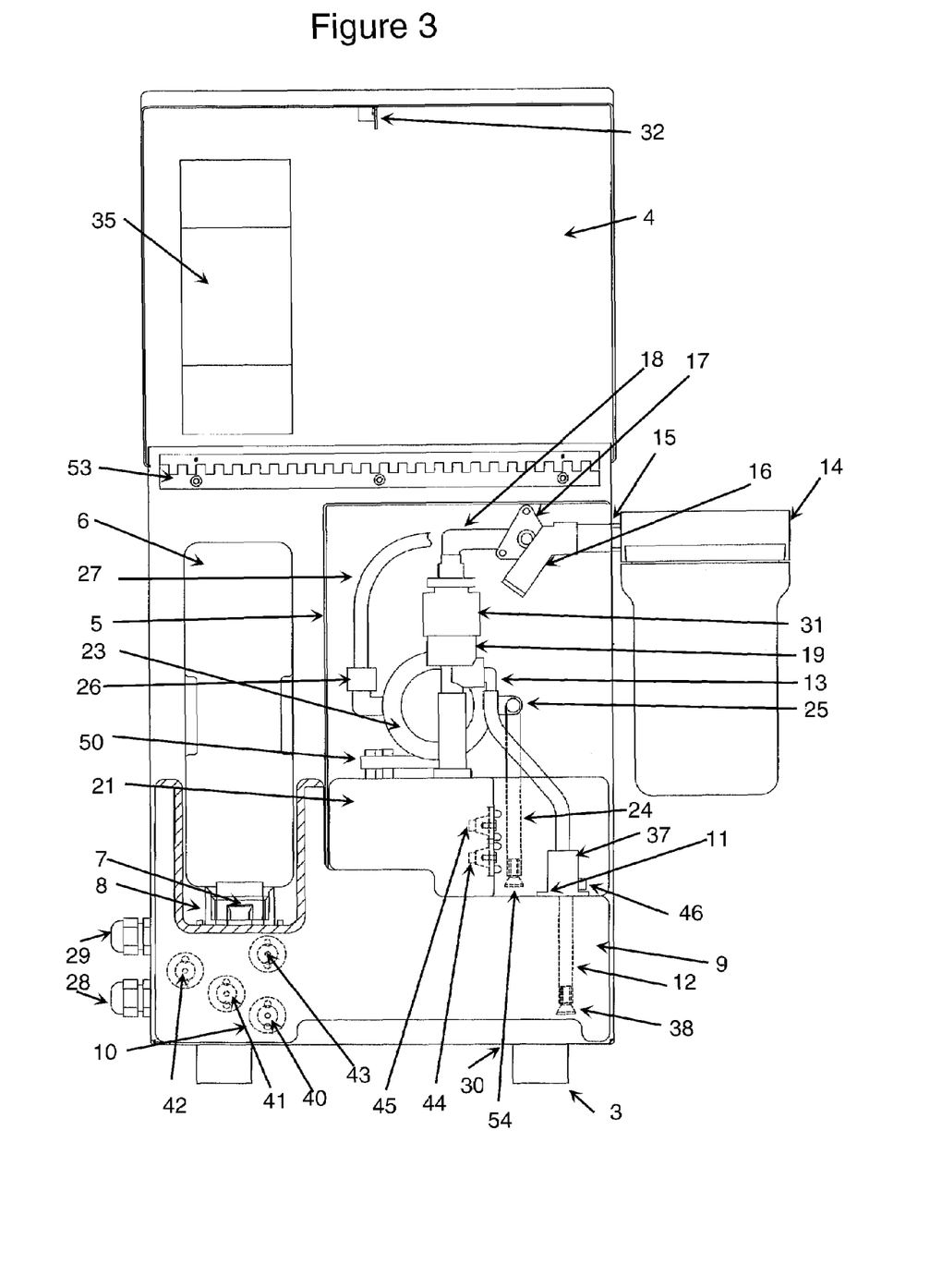
FIG. 3 shows a back view of the unit, with the side of the encasement removed for clarity, including a cross section of the chemical tank.
Figure 4:
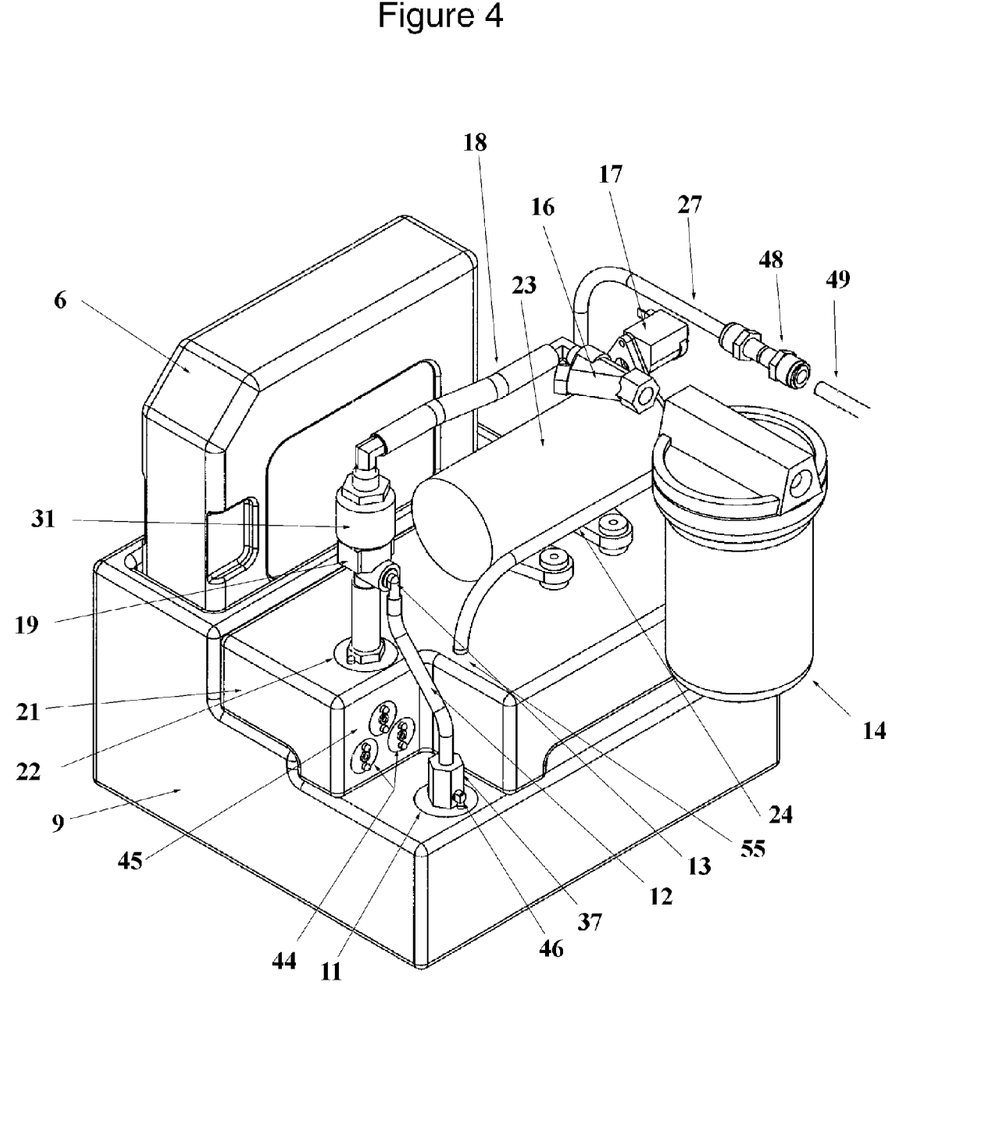
FIG. 4 shows a front view of the device without the encasement for clarity of view.
Figures 5, 5A:
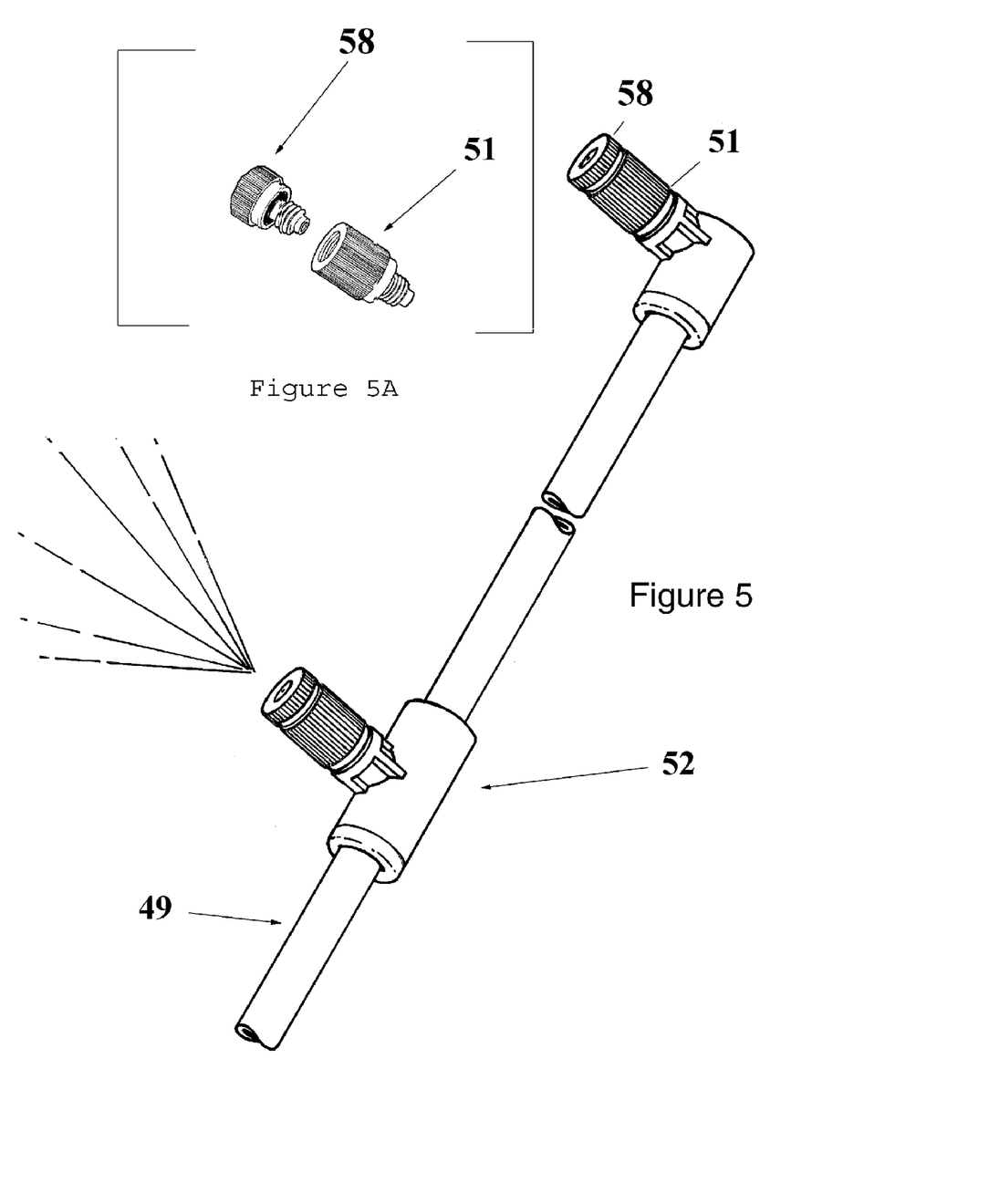
FIG. 5 shows a section of the misting line with atomizing and anti-drip devices attached thereon.
FIG. 5A shows an exploded view of the atomizing device and the anti-drip device. Atomizing device can be used separately from or in conjunction with the anti-drip device.
Figure 6:
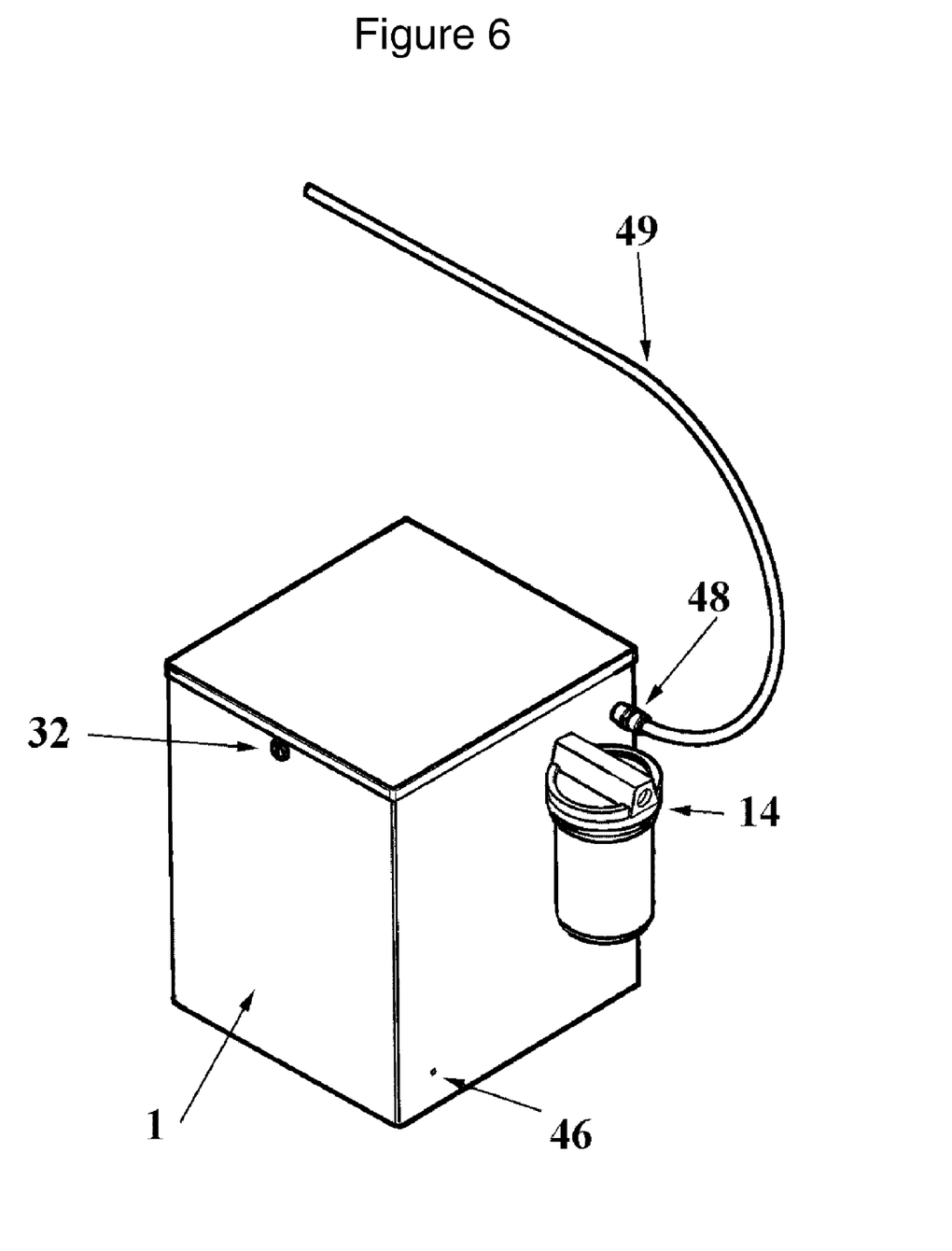
FIG. 6 shows the misting line in relation to the encasement.
Figure 7:
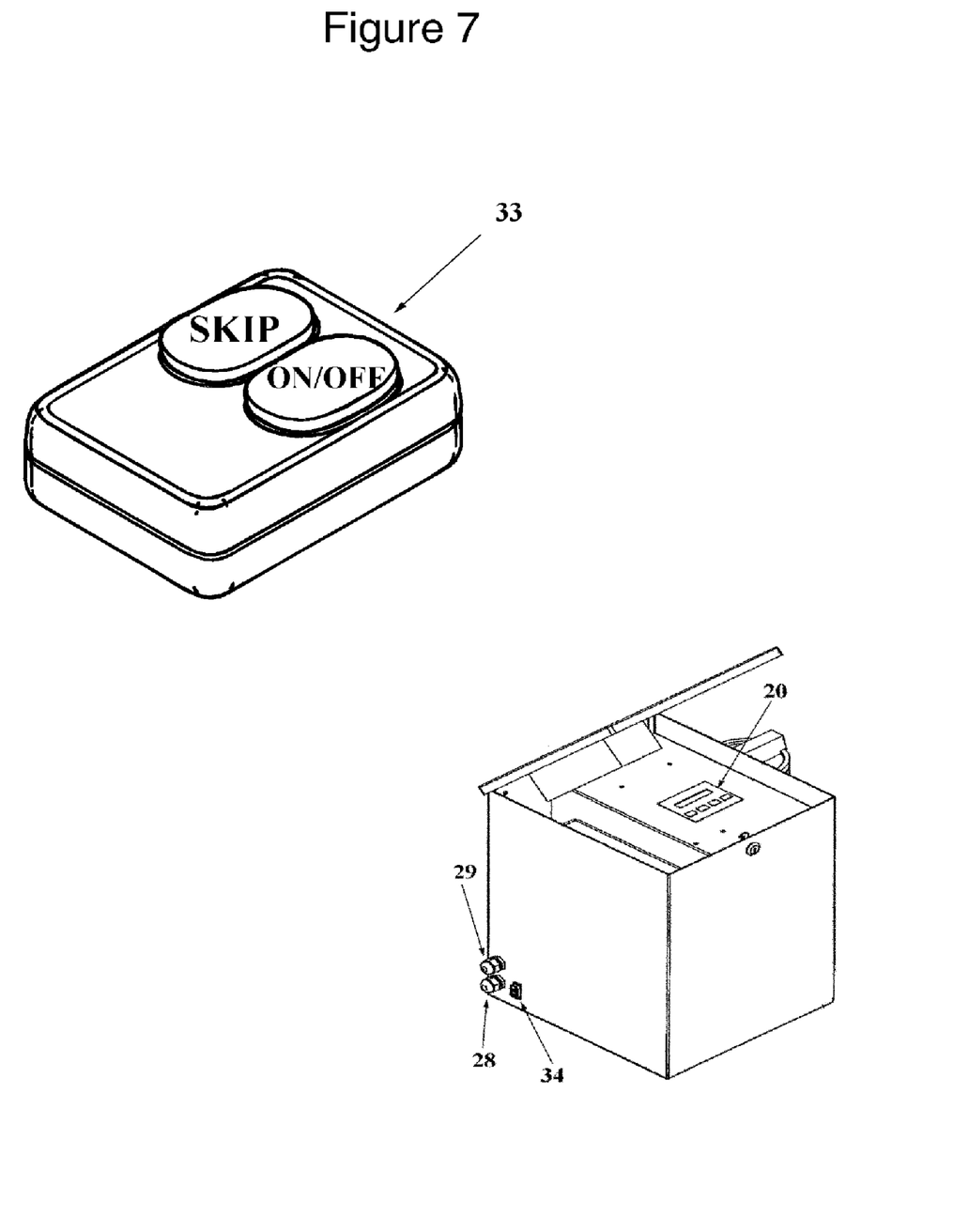
FIG. 7 shows the remote controller.

Pressurizing pump 23 is mounted onto chemical mix tank 21, using motor mounts 50, whereby the suction end of pressuring pump 23 is engaged using one end of a flexible connection 24 which passes from suction pump adaptor 25 on the inlet side of pressurizing pump 23 through hole 55, in chemical mix tank 21 and ends approximately 0.25 of inch from the bottom of chemical mix tank 21. Strainer 54 is placed on the open end of flexible connection 24 to prevent particles that would harm the atomizing devices. Pressuring pump 23 draws chemical/fluid solution from the Chemical Mix tank 21, through the pressuring chambers of the pump, exiting pressurized chemical/fluid solution into pump discharge coupling 26 which is coupled to a discharge manifold 27 using a compression fitting. It is preferable that discharge manifold be flexible in nature so as to ease installation by user. In this embodiment, a flexible polyethylene tube is used. Discharge Manifold 27 exits the encasement 2 through manifold coupling 48. User attaches misting line 49 into opposite end of manifold coupling 48, which is externally mounted on encasement 2, and extends misting line 49 to the point of application whereupon atomizing devices 58 with very small apertures, preferably between 0.007 and 0.012 of an inch, are attached to the misting line 49 using compression style threaded adaptors 52. Another embodiment uses drip prevention mounts 51, prior to engagement of the atomizing device 58 onto the compression style threaded adaptors 52. This prevents the atomizing devices from discharging any chemical/fluid mixture after the pressurizing pump has ceased to function. Atomizing devices 58 dispense the fluid/chemical solution into the atmosphere and onto the foliage where the chemical has the greatest effect.

Various sensors work in conjunction with controller 20 to regulate the mechanical operation of the apparatus. There are at least 4, preferably 5, sensors attached to chemical tank 9. Low level sensors 40 sense if the tank is empty, sensor 41 senses a ½ of total filled capacity is remaining, sensor 42 senses a ⅔ of total filled capacity is remaining and sensor 43 activates when the tank is full. Mix tank 21 has at least 3 sensors. Sensor 44 senses when the mix tank is empty and requires replenishment and sensor 45 is the full sensor which informs the controller to eliminate the filling cycle. Level sensors 40-45 are threadably inserted into sensor mount 10 and are attached to controller 20 using a watertight connection device containing a plurity of wires which have the dual purpose of providing power to the sensors and to relay sensors impulses to controller 20. Controller 20, serves as timer for length of time of discharge and frequency, but also serves as a safety controller responding to readings from sensors to assure that all functions of the apparatus are performed within safety parameters. Apparatus 1 has an electrical source generally accepted as household current of 110 volts, 60 hertz, and electrical source is provided an entrance through encasement 2 through watertight fitting 28, which creates a seal around electrical means when fitting 28 is attached threadably to encasement 2. Another embodiment, is the inclusion of a analog on-off circuit which contain Ground Fault Interrupt logic. GFI switch 34 is encapsulated for weather resistance and is inserted through a cut-out of encasement 2. Controller 20 is receives it's electrical power through electrical connection 28, whereby electrical power means is inserted through electrical connection 28 terminating at the Controller 20. Controller 20 is located inside of encasement 2, in this embodiment, but may be located anywhere on the encasement 2. Immediately adjacent to electrical connection 28 is remote controller connection 29, which is also a liquid tight connection, whereby a plurity of wires are encased in a liquid tight sheath, one end of the wires terminating at controller 20 and the other end is connected to a remote controller 33 shown in FIG. 7. This remote controller 33 is the same as controller 20, only it is mounted remotely from the apparatus 1. This remote controller 33 can also be attached to apparatus 1, through the use of radio frequencies instead of wires. Another embodiment has a remote radio frequency generating device with can communicate with remote controller 33. This remote radio frequency generating device can be connected to sensors in the field of application or can be used to manually operate the apparatus without the use of a wired connection.

What is claimed is:

1. An Improved Self-Contained Insect Repelling and Killing Apparatus comprising: (a) an encasement, (b) an external fluid source connection linked to a filtration device, connected linearly to a solenoid valve and a suction and metering device, (c) a chemical bottle containing a venting cap mounted onto a chemical holding tank positioned into an interior portion of said encasement, (d) said suction and metering device is attached to a chemical mix tank which is appurtenant to said chemical holding tank positioned into said interior portion of said encasement, (e) a mechanical pump for pressurizing and conveying pressurized chemical/fluid mixture from said chemical mix tank to external fluid mixture delivery devices located along a discharge hose connectibly attached on the exterior of said encasement, (f) said fluid mixture delivery devices connected onto said discharge hose, wherein said fluid delivery devices dispense liquid chemical/fluid mixture in an atomized form, (g) a controller, electrically connected to said mechanical pump and said solenoid valve, (h) an electrical power means, and(i) a means for connecting said suction and metering device to said filtration device, said chemical mix tank to said chemical holding tank and said chemical mix tank to said mechanical pump.

2. The apparatus in claim 1 further comprising a lid, one edge of said lid is hingeably attached to said encasement and an edge opposite of said hingeably attached edge of said lid is secured to said encasement by a locking means.

3. The apparatus in claim 1 wherein said encasement is constructed so as to prevent direct application of moisture into the interior portion of said encasement.

4. The apparatus in claim 1 wherein said chemical bottle, and said chemical holding tank are constructed such that there is a seal preventing outside air from intruding internally.

5. The apparatus in claim 1, wherein the electrical power means is 110 volt Alternating Current with Ground Fault Interruption controller including electrical power disconnect that is incorporated inline.

6. The apparatus in claim 4 wherein said chemical bottle and said chemical holding tank are connected with said venting cap that is threadably attached to said chemical bottle.

7. The apparatus in claim 4 wherein fluid monitoring sensors are threadably attached to said chemical holding tank and said chemical mix tank.

8. The apparatus in claim 1 wherein mixture contained inside of said chemical mix tank is agitated immediately prior to application by said fluid mixture delivery devices.

9. The apparatus in claim 1 wherein said suction and metering device creates an effective amount of chemical and fluid mixture for repelling and killing insects.

10. The apparatus in claim 8 wherein said fluid mixture delivery devices are misters.

11. The apparatus in claim 8 wherein said fluid mixture delivery devices are foggers.

12. The apparatus in claim 1 wherein said controller determines the duration and frequency which said mechanical pump operates.

13. An Improved Self-Contained Insect Repelling and Killing Apparatus comprising (a) an encasement, (b) an external fluid source connection linked to a chemical filtration device and a particulate filter device, connected linearly to a solenoid valve and a suction and metering device, (c) a chemical bottle containing a venting cap mounted onto a chemical holding tank positioned into an interior portion of said encasement, (d) said suction and metering device is attached to a chemical mix tank which is appurtenant to said chemical holding tank positioned into said interior portion of said encasement, (e) a mechanical pump for pressurizing and conveying pressurized chemical/fluid mixture from said chemical mix tank to external fluid mixture delivery devices located along a discharge hose connectibly attached on the exterior of said encasement, (f) said fluid mixture delivery devices connected onto said discharge hose, wherein said fluid delivery devices dispense liquid chemical/fluid mixture in an atomized form, (g) a controller, electrically connected to said mechanical pump and said solenoid valve, (h) an electrical power means, and (i) a means for connecting said suction and metering device to said filtration device, said chemical mix tank to said chemical holding tank and said chemical mix tank to said mechanical pump.

14. The apparatus in claim 13 wherein a backflow prevention device is threadably attached to an inlet side of said suction and metering device.

15. An Improved Self-Contained Insect Repelling and Killing Apparatus comprising (a) an encasement, (b) an external fluid source connection linked to a chemical filtration device and a particulate filter device, connected linearly to a solenoid valve and a suction and metering device, (c) a chemical bottle containing a venting cap mounted onto a chemical holding tank positioned into an interior portion of said encasement, (d) said suction and metering device is attached to a chemical mix tank which is appurtenant to said chemical holding tank positioned into said interior portion of said encasement, (e) a mechanical pump for pressurizing and conveying pressurized chemical/fluid mixture from said chemical mix tank to external fluid mixture delivery devices located along a discharge hose connectibly attached on the exterior of said encasement, (f) said fluid mixture delivery devices connected onto said discharge hose, wherein said fluid delivery devices dispense liquid chemical/fluid mixture in an atomized form, (g) a controller, electrically connected to said mechanical pump and said solenoid valve and sensors are threadably attached to said chemical mix tank and said chemical holding tank and are electrically attached to said controller, (h) an electrical power means, and (i) a means for connecting said suction and metering device to said filtration device, said chemical mix tank to said chemical holding tank and said chemical mix tank to said mechanical pump.

16. The apparatus in claim 15 wherein said sensors monitor fluid levels in said chemical holding tank and chemical mix tank communicating fluid levels to said controller.

17. The apparatus in claim 15 wherein said controller is located on the interior of said encasement.

18. The apparatus in claim 15 wherein said controller is located away from said encasement, said controller is electrically connected to said mechanical pump and said solenoid valve by continuous weatherproof wire.

19. The apparatus in claim 15 wherein said controller is located away from said encasement, said controller is electrically connected to said mechanical pump and said solenoid valve by wireless means.

20. An Improved Self-Contained Insect Repelling and Killing Apparatus comprising (a) an encasement, (b) an external fluid source connection linked to a chemical filtration device and a particulate filter device, connected linearly to a solenoid valve and a suction and metering device, (c) a chemical bottle containing a venting cap mounted onto a chemical holding tank positioned into an interior portion of said encasement, (d) said suction and metering device is attached to a chemical mix tank which is appurtenant to said chemical holding tank positioned into said interior portion of said encasement, (e) a chemical shutoff valve having one end threadably attached to said chemical holding tank, and an opposite end of said chemical shut-off valve is connected to said suction and metering device using connection means, (f) a mechanical pump for pressurizing and conveying pressurized chemical/fluid mixture from said chemical mix tank to external fluid mixture delivery devices located along a discharge hose connectibly attached on the exterior of said encasement, said mechanical pump being located immediately vertically adjacent to said chemical mix tank, (g) said fluid mixture delivery devices connected onto said discharge hose, wherein said fluid delivery devices dispense liquid chemical/fluid mixture in an atomized form, (h) a controller, electrically connected to said mechanical pump and said solenoid valve, (i) a backflow prevention device attached to an inlet side of said suction and metering device, (j) an electrical power means, and (k) a means for connecting said suction and metering device to said filtration device, said chemical mix tank to said chemical holding tank and said chemical mix tank to said mechanical pump.

\* \* \* \* \*